(12) United States Patent
Ramorini et al.

(10) Patent No.: US 11,646,658 B2
(45) Date of Patent: May 9, 2023

(54) CHARGE PUMP CIRCUIT, CORRESPONDING DEVICE AND METHOD

(71) Applicant: STMicroelectronics S.r.l., Agrate Brianza (IT)

(72) Inventors: Stefano Ramorini, Milan (IT); Alessandro Gasparini, Cusano Milanino (IT); Alberto Cattani, Cislago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/533,338

(22) Filed: Nov. 23, 2021

(65) Prior Publication Data
US 2022/0166315 A1 May 26, 2022

(30) Foreign Application Priority Data
Nov. 25, 2020 (IT) .......................... 102020000028403

(51) Int. Cl.
*H02M 3/07* (2006.01)
(52) U.S. Cl.
CPC .......... *H02M 3/077* (2021.05); *H02M 3/076* (2021.05)
(58) Field of Classification Search
None
See application file for complete search history.

(56) References Cited

U.S. PATENT DOCUMENTS

| 5,874,850 | A | * | 2/1999 | Pulvirenti | H02M 3/073 363/60 |
|---|---|---|---|---|---|
| 10,483,846 | B1 | | 11/2019 | Allegrini et al. | |
| 10,630,173 | B2 | | 4/2020 | Zou et al. | |
| 10,848,058 | B2 | * | 11/2020 | Ippolito | H02M 3/07 |
| 2002/0130705 | A1 | | 9/2002 | Meng et al. | |
| 2012/0249223 | A1 | | 10/2012 | Neugebauer | |

FOREIGN PATENT DOCUMENTS

WO 2006061952 A1 6/2006

OTHER PUBLICATIONS

IT Search Report and Written Opinion for priority application (IT Appl. 102020000028403) dated Jul. 30, 2021 (8 pages).

* cited by examiner

*Primary Examiner* — Jeffery S Zweizig
(74) *Attorney, Agent, or Firm* — Crowe & Dunlevy

(57) ABSTRACT

Charge pump stages are coupled between flying capacitor pairs and arranged in a cascaded between a bottom voltage line and an output voltage line. Gain stages apply pump phase signals having a certain amplitude to the charge pump stages via the flying capacitors. A feedback signal path from the output voltage line to the bottom voltage line applies a feedback control signal to the bottom voltage line. Power supply for the gain stages is provided by a voltage of the feedback control signal in order to control the amplitude of the pump phase signals. An asynchronous logic circuit generates the switching drive signals for the gain stages with a certain switching frequency which is a function of a logic supply voltage derived from the voltage of the feedback control signal.

11 Claims, 6 Drawing Sheets

US 11,646,658 B2

CHARGE PUMP CIRCUIT, CORRESPONDING DEVICE AND METHOD

PRIORITY CLAIM

This application claims the priority benefit of Italian Application for Patent No. 102020000028403, filed on Nov. 25, 2020, the content of which is hereby incorporated by reference in its entirety to the maximum extent allowable by law.

TECHNICAL FIELD

The description relates to charge pump circuits.

One or more embodiments are applicable, for instance, in connection with various types of sensors (MEMS sensors, for instance) and/or one-time-programmable (OTP) memories in a wide range of consumer electronics devices.

BACKGROUND

Charge pump circuits are extensively used in various areas of electronics essentially as converters capable of storing electrical charge on capacitors, for increasing or decreasing a DC voltage, for instance.

Charge pump circuits are commonly used in low-power electronics (in mobile communication devices, for instance) also in view of their ability to provide controlled supply voltages and/or reducing power consumption.

Despite the extensive activity in the area, further improved solutions are desirable in respect of one or more of the following aspects: a) control of key parameters of the charge pump, such as the output voltage $V_{OUT}$ and resistance, with the ability to provide (very) large variations on $V_{OUT}$, retaining accuracy and precision on the output voltage $V_{OUT}$, for instance; b) fast transient response of key parameters; c) high PSRR (power supply rejection ratio) with respect to the input voltage $V_{IN}$; and d) reduced capacitor size, which is beneficial in terms of (semiconductor) area occupation.

There is a need in the art to contribute in providing charge pump circuits improved along the lines discussed in the foregoing.

SUMMARY

One or more embodiments may relate to a circuit.

One or more embodiments may relate to a corresponding device.

A sensor (a Micro Electro-Mechanical Systems (MEMS sensor), for instance) and/or a memory (a one-time-programmable (OTP) memory, for instance) coupled with a charge pump circuit as exemplified herein may be exemplary of such a device.

One or more embodiments may relate to a corresponding method.

In one or more embodiments key parameters of a charge pump can be controlled via a control loop, which facilitates robust and fast control.

One or more embodiments lend themselves to being implemented as a flexible solution where the parameters of a charge pump can be controlled and adapted to external conditions such as input voltage and load current.

These features can be particularly appreciated in certain consumer electronics applications where full access (reading and programming) of a one-time-programmable (OTP) memory during device lifetime is a desirable feature.

High current capability, fast transient response and reduced area are issues which can be successfully addressed in one or more embodiments.

For instance, one or more embodiments facilitate providing a fully integrated charge pump capable of applying a high voltage (>15V) to an OTP memory cell and burning it with a current capability of at least 1 mA.

BRIEF DESCRIPTION OF THE DRAWINGS

One or more embodiments will now be described, by way of example only, with reference to the annexed figures, wherein.

DETAILED DESCRIPTION

In the following description various specific details are given to provide a thorough understanding of various exemplary embodiments of the present specification. The embodiments may be practiced without one or several specific details, or with other methods, components, materials, etc. In other instances, well-known structures, materials, or operations are not shown or described in detail in order to avoid obscuring various aspects of the embodiments. Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings/references provided herein are for convenience only, and therefore do not interpret the extent of protection or scope of the embodiments.

Also, throughout this description, a same designation may be used for simplicity in order to indicate a certain element or component as well as a signal occurring at that element or component and/or a certain electrical parameter (resistance value, for instance) associated therewith.

Figure 1:
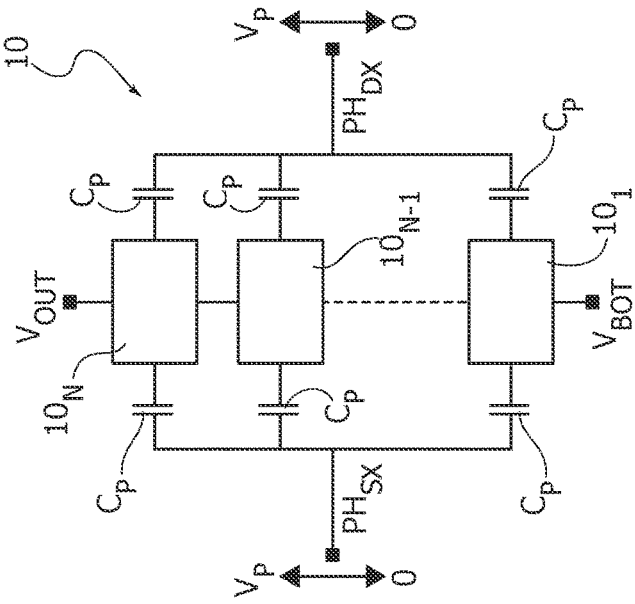
FIG. 1 is a block diagram of a charge pump circuit.

By way of background, a charge pump 10 can be generally represented as illustrated in FIG. 1, namely as a set of N stages $10_1, \ldots, 10_{N-1}, 10_N$ (N=1, 2, . . . ) each having associated "flying" capacitors $C_P$ coupling the stage to "phase" voltages $PH_{SX}$ and $PH_{DX}$, which can be set to voltage levels 0 and $V_P$.

As illustrated, the stages $10_1, \ldots, 10_{N-1}, 10_N$ (with the associated capacitors $C_P$) are arranged in parallel between circuit nodes to which $PH_{SX}$ and $PH_{DX}$ are applied. The stages $10_1, \ldots, 10_{N-1}, 10_N$ are thus staggered starting from a bottom node or line at an input voltage $V_{BOT}$ to pump charge towards a top output node or line at voltage $V_{OUT}$.

The diagram of FIG. 1 is thus exemplary of a charge pump circuit 10 comprising a plurality of charge pump stages $10_1, 10_2, \ldots$ coupled between pairs of flying capacitors $C_P$, the plurality of charge pump stages $10_1, 10_2, \ldots$ arranged in a cascaded arrangement from a bottom voltage line $V_{BOT}$ to an output voltage line $V_{OUT}$.

It will be otherwise appreciated that, for the sake of brevity and ease of understanding, a same designation ($V_{BOT}$, $V_{OUT}$, $C_P$, $R_{OUT}$, for instance) may be used throughout this description to denote both a certain node or component (a line, a capacitor, a resistor, . . . ) and an associated electrical parameter (voltage, capacitance, resistance, . . . ).

Figure 2:
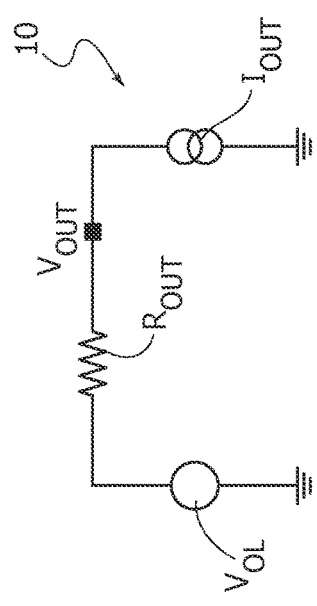
FIG. 2 is exemplary of a possible model representation of the circuit of FIG. 1.

A charge pump circuit 10 as illustrated in FIG. 1 can be modelled as shown in FIG. 2, namely as a voltage generator $V_{OL}$ providing an open loop voltage $V_{OL}=V_{BOT}+N^*V_P$ which is applied via resistor $R_{OUT}$ to an output node at voltage $V_{OUT}$ to provide in turn an output current $I_{OUT}$ so that $V_{OUT}=V_{OL}-R_{OUT}^*I_{OUT}$.

In a model of the circuit of FIG. 1 as illustrated in FIG. 2, a resistance (impedance) value of the resistor $R_{OUT}$ can be expressed mathematically in the form $R_{OUT}=N/(2^*C_P^*F_{SW})$, where $C_P$ is the capacitance value of the flying capacitors associated with the various stages $10_1, \ldots, 10_{N-1}, 10_N$ and $F_{SW}$ denotes the frequency of switching the voltages $PH_{SX}$ and $PH_{DX}$ between 0 and $V_P$.

A charge pump circuit 10 and a corresponding model as illustrated in FIGS. 1 and 2 are otherwise conventional in the art, which makes it unnecessary to provide a more detailed description herein.

It is noted that achieving a high current capability in a charge pump circuit 10 as illustrated in FIG. 1 is facilitated by reducing the output resistance $R_{OUT}$ (which may involve reducing the number N of stages $10_1, \ldots, 10_N$), increasing the capacity $C_P$ of the flying capacitors and increasing the switching frequency $F_{SW}$.

The flying capacitor size has a notable impact in terms of semiconductor area occupied and militates against a fully integrated solution.

It is similarly noted that a fast transient behavior is facilitated in an architecture providing a large variation of both the output resistance $R_{OUT}$ and the open loop voltage, $V_{OL}$ in response to an output variation on $V_{OUT}$.

Figure 3:
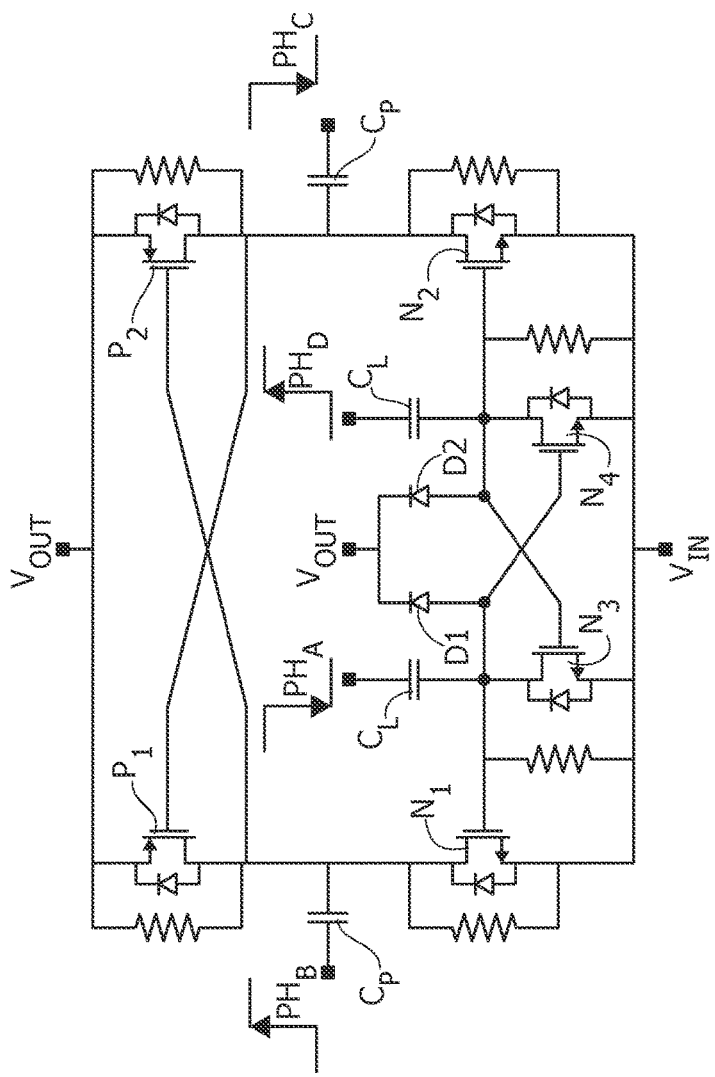
FIG. 3 is a diagram of a conventional multi-phase pumping cell circuit.
Figure 3A:
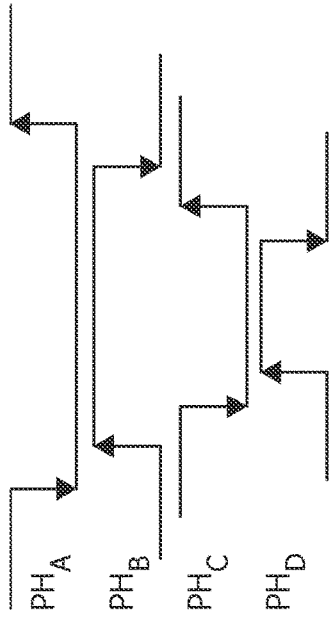
FIG. 3A illustrates possible phases of operation for the circuit in FIG. 3.

FIGS. 3 and 3A are illustrative of a four-phase pumping cell solution which facilitates achieving an improved behavior in terms of current capability, output resistance and charge pump efficiency.

FIG. 3 illustrates by way of example a pumping stage based on a double-edge architecture, with 4-phase non-overlapping clock signals $PH_A$, $PH_B$, $PH_C$ and $PH_D$ and including four power switches (power MOS transistors $P_1$, $P_2$, $N_1$ and $N_2$ for instance) which are responsible for charge delivery towards a load at a voltage $V_{OUT}$. As illustrated, two further switches (NMOS transistors $N_3$ and $N_4$, for instance) can be used to drive the charge pump low-side stage.

As illustrated in FIG. 3:

a capacitor $C_L$ is coupled to a node intermediate the gates of the transistors $N_1$ and $N_4$, which node is also coupled to the source-drain current flow path through the transistor $N_3$ (at the drain thereof);

a capacitor $C_P$ is coupled to the source-drain current flow paths through the transistors $P_1$ and $N_1$ at an intermediate node between the mutually-coupled drains of the transistors $P_1$ and $N_1$;

a capacitor $C_P$ is coupled to the source-drain current flow paths through the transistors $P_2$ and $N_2$ at an intermediate node between the mutually-coupled drains of the transistors $P_2$ and $N_2$; and a capacitor $C_L$ is coupled to a node intermediate the gates of the transistors $N_2$ and $N_3$ (which node is also coupled to the source-drain current flow path through the transistor $N_4$ (at the drain thereof).

As illustrated in FIG. 3, the node intermediate the gates of $N_1$ and $N_4$ and the node intermediate the gates of $N_1$ and $N_4$ are referred to the output voltage $V_{OUT}$ via diodes D1 and D2 arranged to prevent current flow from $V_{OUT}$, that is with their cathodes towards $V_{OUT}$. The diodes D1 and D2 thus act as protection diodes in order not to exceed the maximum gate-to-source voltage of the transistors N1, N2, N3, N4 when $PH_D/PH_A$ have a low-to-high transition.

In FIG. 3, all the MOSFET transistors are represented with their recirculation diodes as common in the art. The associated "on" resistances RDSon are also illustrated, while not referenced for simplicity.

As illustrated in FIG. 3, such a "four-phase" pumping cell comprises two latched structures coupled between an input voltage $V_{IN}$ and an output voltage $V_{OUT}$, namely:

an "external" latch comprising a first pair of transistors $P_1$, $P_2$ (PMOS transistors, for instance) and a second pair of transistors $N_1$, $N_2$ (NMOS transistors, for instance, that is transistors of opposed polarity to the transistors of the first pair), and an "internal" latch comprising a third pair of transistors $N_3$, $N_4$ (NMOS transistors, for instance, that is transistors of the same polarity as the transistors of the second pair).

Four phases as desired for correct operation of the pumping stage can be generated automatically (internally), without the use of external clock source, as exemplified in FIG. 3A. For example, these phases are generated using a state machine circuit.

The signal $PH_A$ going "low" is exemplary of the switch $N_1$ being switched off (made non-conductive) which is followed by $PH_B$ going "high" with current pumped towards the body diode of the MOSFET $P_1$ and the MOSFET $P_2$ switched off (non-conductive).

The signal $PH_C$ going "low" is exemplary of the MOSFET $P_1$ being switched on (made conductive) with current pumped through the "on" resistance Ron of the MOSFET $P_1$ and the MOSFET $P_2$ in an on (conductive) state, which is followed by the signal $PH_D$ going "high" with the MOSFET $N_2$ turned on (made conductive) and turning on of MOSFET $P_1$ confirmed. Such a state machine being asynchronous (that is, not provided with an internal clock) facilitates increasing the switching frequency and reducing the output resistance.

In a solution as exemplified in FIG. 3 and FIG. 3A, phase generation may occur in a closed-loop arrangement with reduced skew between events: phases are event-driven and are generated with according to a cause-effect logic, which facilitates reducing skew.

All logic elements in the core are connected to a single supply $V_X$ and level shifters in the loop (that can affect the switching frequency) are avoided.

For instance, the related digital core may sense a real phase signal as provided at the input of the pumping stage and phase-doubler and generate a next phase accordingly. Such a 4-phase arrangement facilitates avoiding undesired cross-conduction within the pumping stage and makes the charge pump more area-efficient and energy-efficient.

In such a conventional arrangement, a phase sequence as exemplified in FIG. 3A can be designed in order to manage first the internal latch comprising the MOSFETs $N_3$ and $N_4$, by pumping the capacitors $C_L$, then to pump charge to $V_{OUT}$ through the flying capacitors $C_P$ from the intermediate node between the mutually-coupled drains of the MOSFETs $P_1$ and $N_1$ and the intermediate node between the mutually-coupled drains of the MOSFET $P_2$ and $N_2$.

By using this approach, the charge injected through the flying capacitors $C_P$ is not wasted in changing the status of the external latch, which results in a higher current capability and efficiency and in a lower output resistance.

A goal pursued in the asynchronous logic which generates the phase signals $PH_A$, $PH_B$, $PH_C$, $PH_D$ may thus be managing the four phases of the cell with a reduced time delay between one phase and the next one, thus increasing the switching frequency and reducing the output resistance.

In such an arrangement, because of the self-clocked architecture, the switching frequency $F_{CK}$ of the charge pump is expected to be high, notionally the highest possible.

A related drawback lies in a possible large PVT (Process, Voltage and Temperature) variation of $F_{CK}$. This suggests designing the charge pump considering a "worst case" for the switching frequency in order to facilitate achieving a desired current capability.

Figure 4:
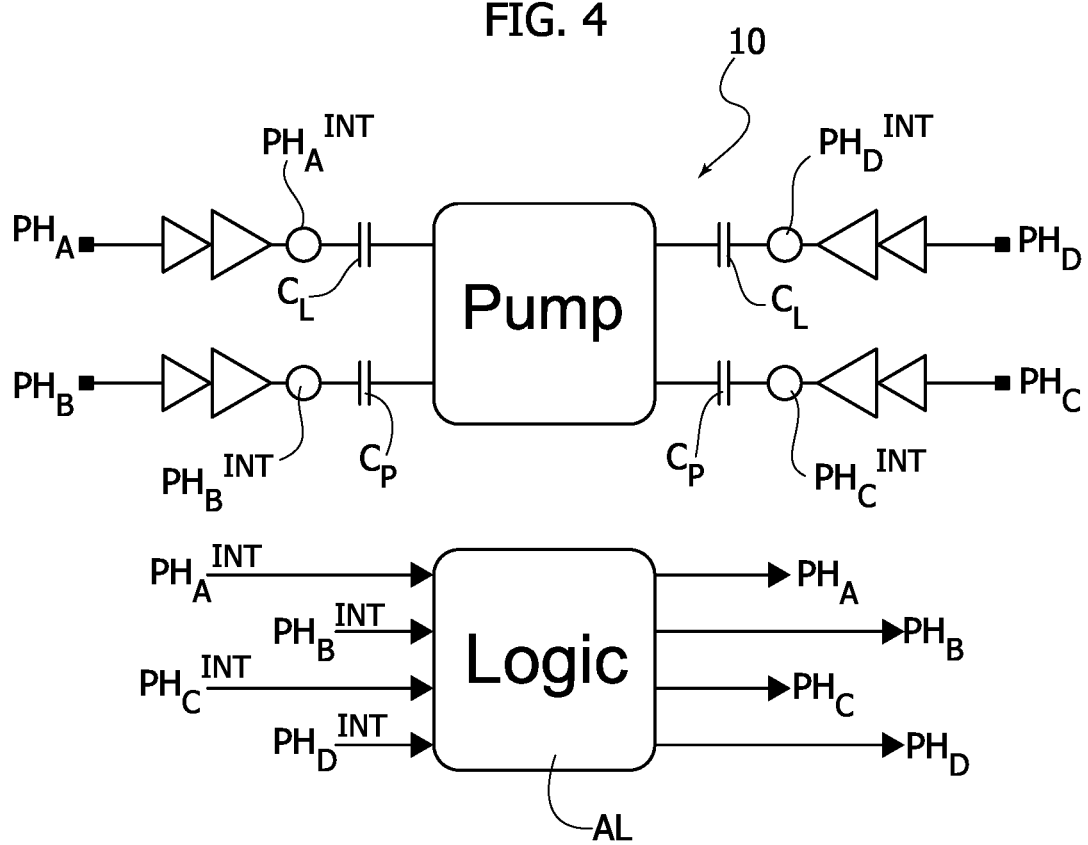
FIG. 4 is a block diagram exemplary of a multi-phase charge pump circuit using an asynchronous logic approach.

FIG. 4 is a block diagram exemplary of a multi-phase charge pump circuit 10 (a four-phase cell, for instance) with an associated asynchronous logic AL as exemplified in FIG. 3.

The representation of FIG. 4, is exemplary of the possibility (which was discussed in the following) of operating such a cell as function of signals $PH_A$, $PH_B$, $PH_C$, $PH_D$ produced derivable in an asynchronous logic AL starting from corresponding "internal" (feedback) signals $PH_A{}^{INT}$, $PH_B{}^{INT}$, $PH_C{}^{INT}$, $PH_D{}^{INT}$.

Figure 4A:
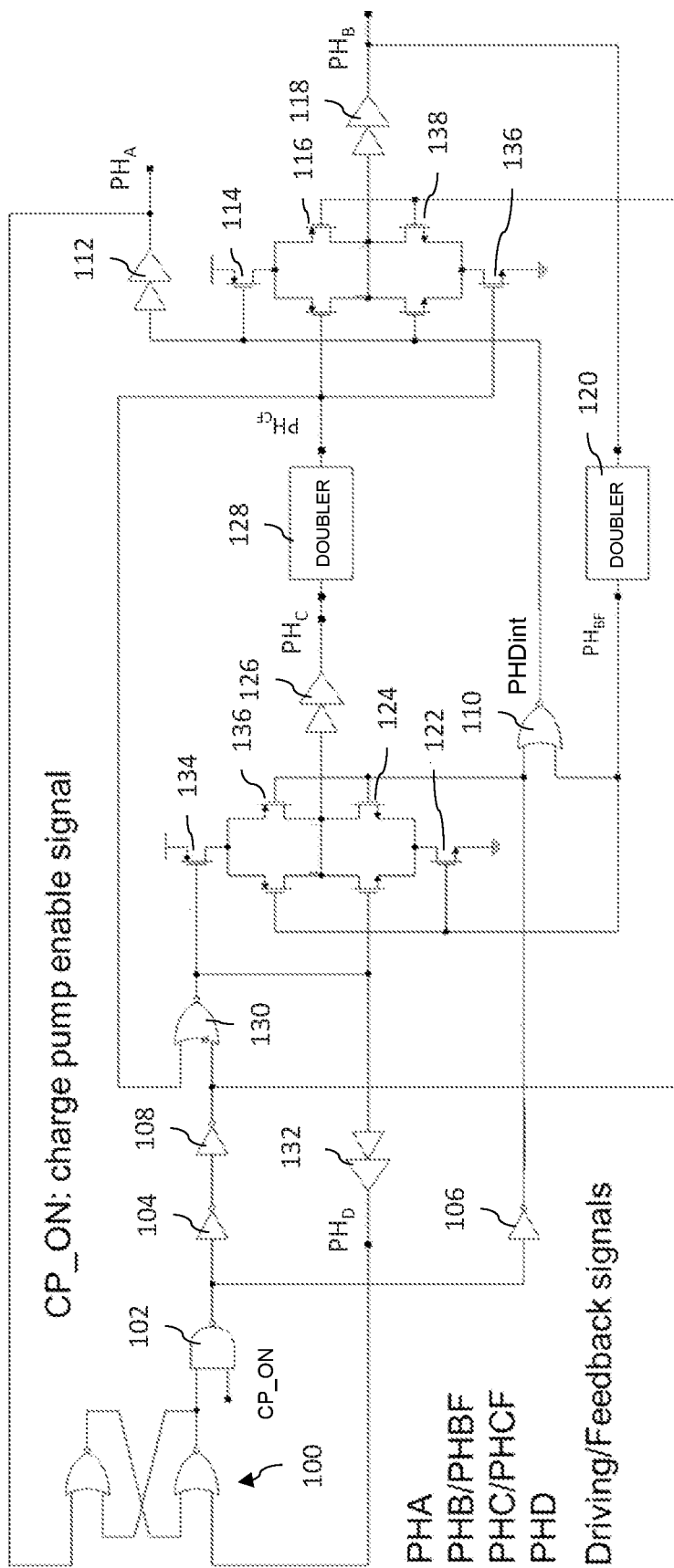
FIG. 4A shows a circuit diagram for an example of the asynchronous logic for generating the phases.

FIG. 4A shows an example of a circuit diagram for the asynchronous logic AL. Operation is as follows in order to generate the phase signal waveforms as shown in FIG. 3A: a) at time t0, CP_ON is logic 0 and this is a static condition for the phases and the NOR latch 100 outputs a logic 1 value; b) from time t0 to t1, CP_ON changes to logic 1 and the state machine evolves so that logic stage of $PH_A$ changes from logic 1 to logic 0 (the output of NAND gate 102 transitions to logic 0, the outputs of inverters 104 and 106 transition to logic 1, the output of inverter 108 transitions to logic 0; the output of NOR gate 110 transitions to logic 0; and the output $PH_A$ changes to logic 0 through driver 112); c) from time t1 to t2, the state machine evolves so that logic stage of $PH_B$ changes from logic 0 to logic 1 (transistors 114 and 116 turn on; and the output $PH_B$ changes to logic 1 through driver 118); d) from time t2 to t3, the state machine evolves so that logic stage of $PH_C$ changes from logic 1 to logic 0 (the output $PH_B$ becomes the feedback signal $PH_{BF}$ at logic 1 through doubler circuit 120; transistors 122 and 124 turn on; and the output $PH_C$ changes to logic 0 through driver 126); e) from time t3 to t4, the state machine evolves so that logic stage of $PH_C$ changes from logic 0 to logic 1 (the output $PH_C$ becomes the feedback signal $PH_{CF}$ at logic 0 through doubler circuit 128; the output of the NOR gate changes to logic 1; and the output $PH_D$ changes to logic 1 through driver 132); f) the NOR latch 100 now changes from logic 1 to logic 0 in response to feedback provided by the signals $PH_A$ and $PH_D$; g) from time t4 to t5, the state machine evolves so that logic stage of $PH_D$ changes from logic 1 to logic 0 (the output of NAND gate 102 transitions to logic 1, the outputs of inverters 104 and 106 transition to logic 0, the output of inverter 108 transitions to logic 1; the output of NOR gate 130 transitions to logic 0; and the output $PH_D$ changes to logic 0 through driver 132); h) from time t5 to t6, the state machine evolves so that logic stage of $PH_C$ changes from logic 0 to logic 1 (transistors 134 and 136 turn on; and the output $PH_C$ changes to logic 1 through driver 126); i) from time t6 to t7, the state machine evolves so that logic stage of $PH_B$ changes from logic 1 to logic 0 (the output $PH_C$ becomes the feedback signal $PH_{CF}$ at logic 1 through doubler circuit 128; transistor s 136 and 138 turn on; and the output $PH_B$ changes to logic 0 through driver 118); j) from time t7 to t8, the state machine evolves so that logic stage of $PH_A$ changes from logic 0 to logic 1 (the output $PH_B$ becomes the feedback signal $PH_{BF}$ at logic 0 through doubler circuit 120; the output of the NOR gate 110 changes to logic 0; and the output $PH_A$ changes to logic 1 through driver 112); and k) the NOR latch 100 now changes from logic 0 to logic 1, and the process repeats. This is asynchronous operation as no input clock is needed to control the phase signal generation.

Figure 5:
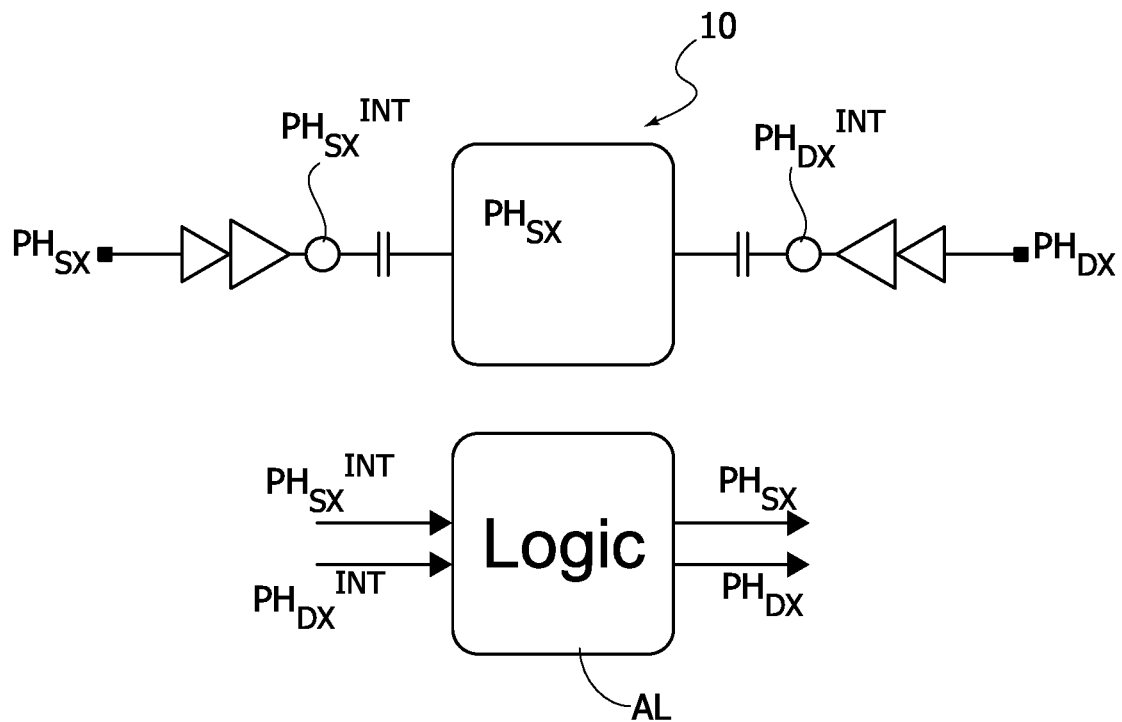
FIG. 5 is a block diagram of a simplified representation of the multi-phase charge pump circuit.

For ease of understanding, the subsequent discussion, possibly applying to multiple pumping stages, will refer to simplified representation of FIG. 5. There, consistently with the general representation of FIG. 1, two "phase" voltages $PH_{SX}$ and $PH_{DX}$, along with corresponding "internal" signals $PH_{SX}{}^{INT}$ and $PH_{DX}{}^{INT}$ are shown.

A "four-phase" pumping stage approach with self-clocked asynchronous logic as discussed previously can be used in conjunction with different control techniques.

Figure 6:
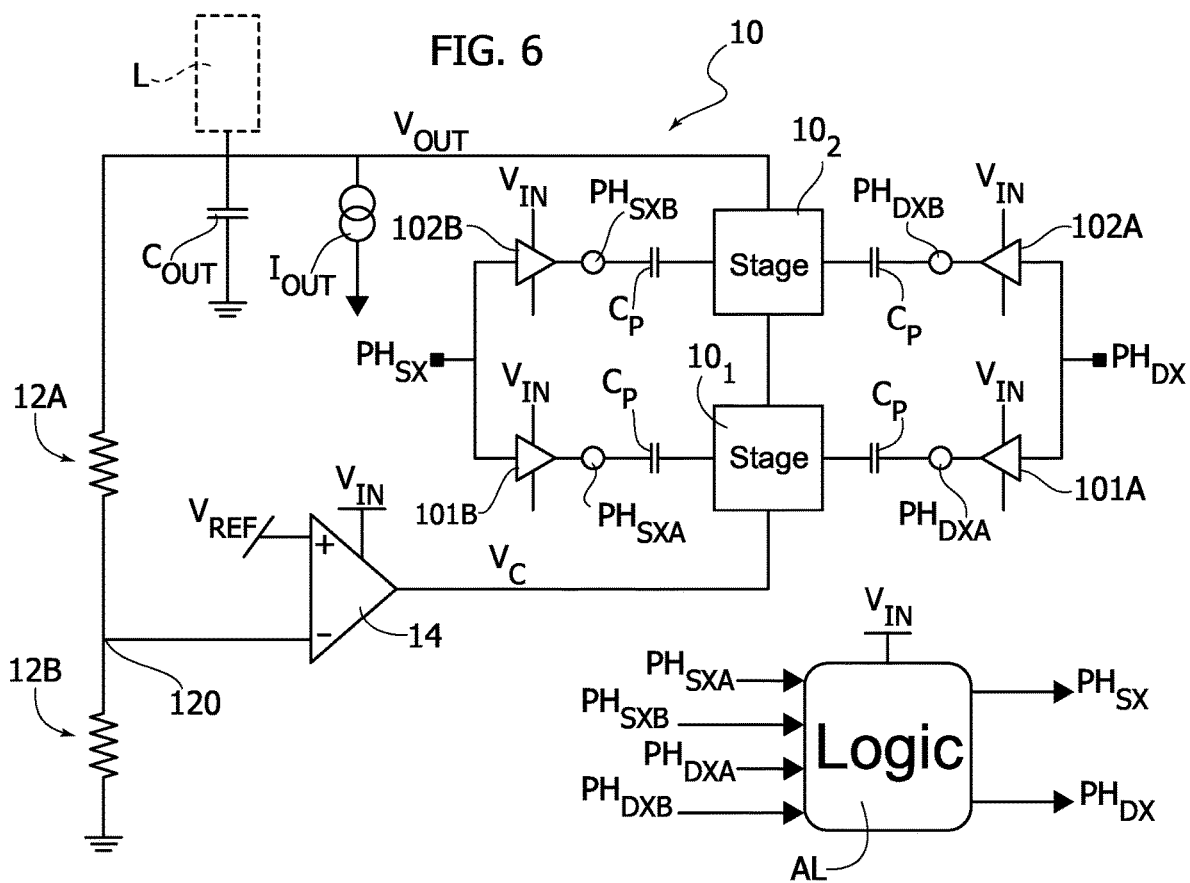
FIG. 6 is a block diagram of a closed-loop charge pump with bottom charge pump control.

For instance, FIG. 6 is a diagram of a corresponding self-clocked charge pump closed loop architecture with bottom voltage control.

Briefly, the charge pump circuit of FIG. 6 comprises two stages $10_1$, $10_2$ having applied via associated flying capacitors $C_P$ (see FIG. 1 with N=2) respective "actual" phase signals $PH_{DXA}$, $PH_{SXA}$ (stage $10_1$) and $PH_{DXB}$, $PH_{SXB}$ (stage $10_2$).

These signals result from the application of phase signals $PH_{DX}$ and $PH_{SX}$ via amplifier stages 101A and 102A (with $PH_{DXA}$ and $PH_{DXB}$ resulting from $PH_{DX}$) as well as 101B and 102B (with $PH_{SXA}$ and $PH_{SXB}$ resulting from $PH_{SX}$).

In line with the general layout illustrated in FIG. 1, the stages $10_1$, $10_2$ (with the associated capacitors $C_P$) are thus arranged in parallel between the circuit nodes to which signals $PH_{SX}$ and $PH_{DX}$ are applied staggered or stacked from a "bottom" voltage line $V_C$ (also referred to herein as $V_{BOT}$) to an output voltage line $V_{OUT}$ towards which electrical charge is pumped to be charged onto an output capacitor $C_{OUT}$ with the capability of generating a output current $I_{OUT}$ for supplying a load L.

Advantageously, such a load L may be a distinct element from the embodiments.

By way of example, the load L may be a sensor (a MEMS sensor, for instance) or a memory (an OTP memory, for instance).

As illustrated in FIG. 6, a resistive voltage divider including resistors 12A, 12B is coupled to the output voltage line $V_{OUT}$ with the voltage at the intermediate node 120 of the voltage divider fed back to one of the inputs (inverting, for instance) of a differential stage 14, supplied at an input voltage $V_{IN}$.

The other input (non-inverting, for instance) of the differential stage 14 is set to a reference voltage $V_{REF}$. The output from the differential stage 14 is coupled to the "bottom" line of the pump stages $10_1$, $10_2$ to apply thereto a voltage $V_C$ which is a function of the difference between the reference voltage $V_{REF}$ and the voltage at the intermediate node 120 of the divider 12A, 12B which is in turn a function (via the partition ratio of the divider 12A, 12B) of the output voltage $V_{OUT}$.

In an arrangement as exemplified in FIG. 6, an asynchronous logic AL is assumed to be available supplied by a voltage $V_{IN}$ (this may correspond to the supply voltage of the amplifier stages 101A, 102A and 101B, 102B) and configured to generate (using any suitable asynchronous logic circuit as designable by those of skill in the art) the phase signals $PH_{DX}$ and $PH_{SX}$ as a function of the signals $PH_{SXA}$, $PH_{SXB}$, $PH_{DXA}$ and $PH_{DXB}$ as sensed.

Figure 6A:
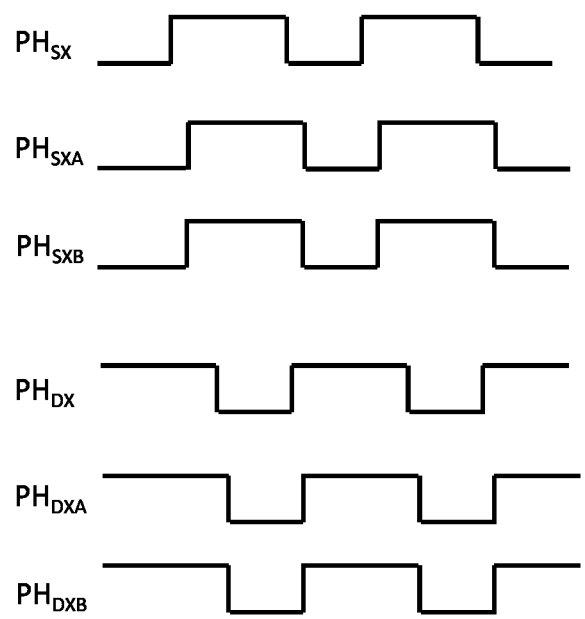
FIG. 6A is a timing diagram.

For instance, with $PH_{SX}$ rising, both $PH_{SXA}$ and $PH_{SXB}$ are at "1" and $PH_{DX}$ goes low. When, as a consequence, both $PH_{DXA}$ and $PH_{DXB}$ are at "0", the logic raises $PH_{DX}$. When, as a consequence, both $PH_{DXA}$ and $PH_{DXB}$ are high, the logic lowers $PH_{SX}$. When, as a consequence, both $PH_{SXA}$ and $PH_{SXB}$ are low, the logic raises $PH_{SX}$, and a new cycle starts. See, timing diagram of FIG. 6A for an example waveform.

This was found to represent a safe way of operation, which facilitates having the command $PH_{SX}/PH_{DX}$ adequately replicated in all the cells. That is, if $PH_{SX}$ rises the logic does not evolve until both $PH_{SXA}$ and $PH_{SXB}$ go to "1", the same applying to each transition in $PH_{SX}/PH_{DX}$.

A simpler logic may facilitate having a control signal, such as $PH_{SX}$, for instance, adequately replicated in a single cell.

It will be otherwise appreciated that, rather than with the generation of phase signals such as $PH_{DX}$ and $PH_{SX}$ (and $PH_{SXA}$, $PH_{SXB}$, $PH_{DXA}$ and $PH_{DXB}$), one or more embodiments are primarily related with the control action as exemplified in FIG. 6 by the feedback network including the voltage divider 12A, 12B and the differential stage 14.

For instance, it is noted that a bottom voltage control action ($V_C$ as a function of $V_{OUT}$) as exemplified in FIG. 6, can only adjust the open load voltage, $V_{OL}$ of the model in FIG. 2.

In fact, the following relationships apply to an arrangement as illustrated in FIG. 6:

$$V_{OL}=V_C+N*V_{IN};$$

$$R_{OUT}=N/(2*C_P*F_{SW})$$

$$V_{OUT}=V_C+N*V_{IN}-R_{OUT}*I_{OUT}.$$

(with N=2 in the case shown).

It is noted that an arrangement as illustrated in FIG. 6 is exemplary of a (very) weak control technique since a variation on the control voltage $V_C$ provides a small variation on $V_{OUT}$, namely $dV_{OUT}=dV_C$ In a control approach as illustrated in FIG. 6, a change in $V_{IN}$ rapidly leads to a change in the amplitude of the phase signals $PH_{SXA}$, $PH_{SXB}$, $PH_{DXA}$, $PH_{DXB}$ and the switching frequency $F_{SW}$ of the asynchronous logic AL increases with $V_{IN}$), providing a (very) poor PSRR with respect to $V_{IN}$. This may result in a transient on $V_{OUT}$ or even in a complete loss of regulation.

Also, a control approach as illustrated in FIG. 6 is hardly suitable to manage different values of $V_{IN}$ and $I_{OUT}$. As noted, transient response is poor in view of the intrinsic weakness of this control technique.

Figure 7:
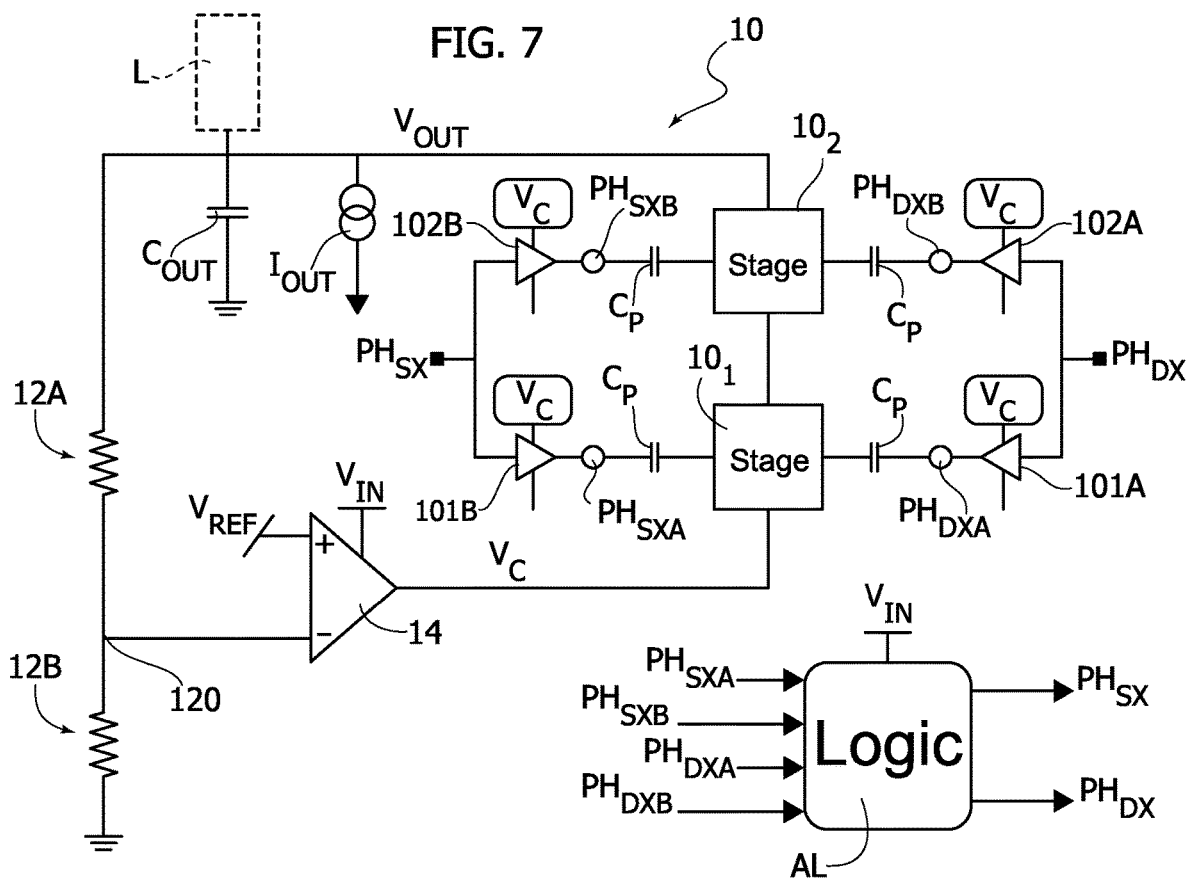
FIG. 7 is a block diagram of a closed-loop charge pump with bottom control combined with phase amplitude control.
Figure 8:
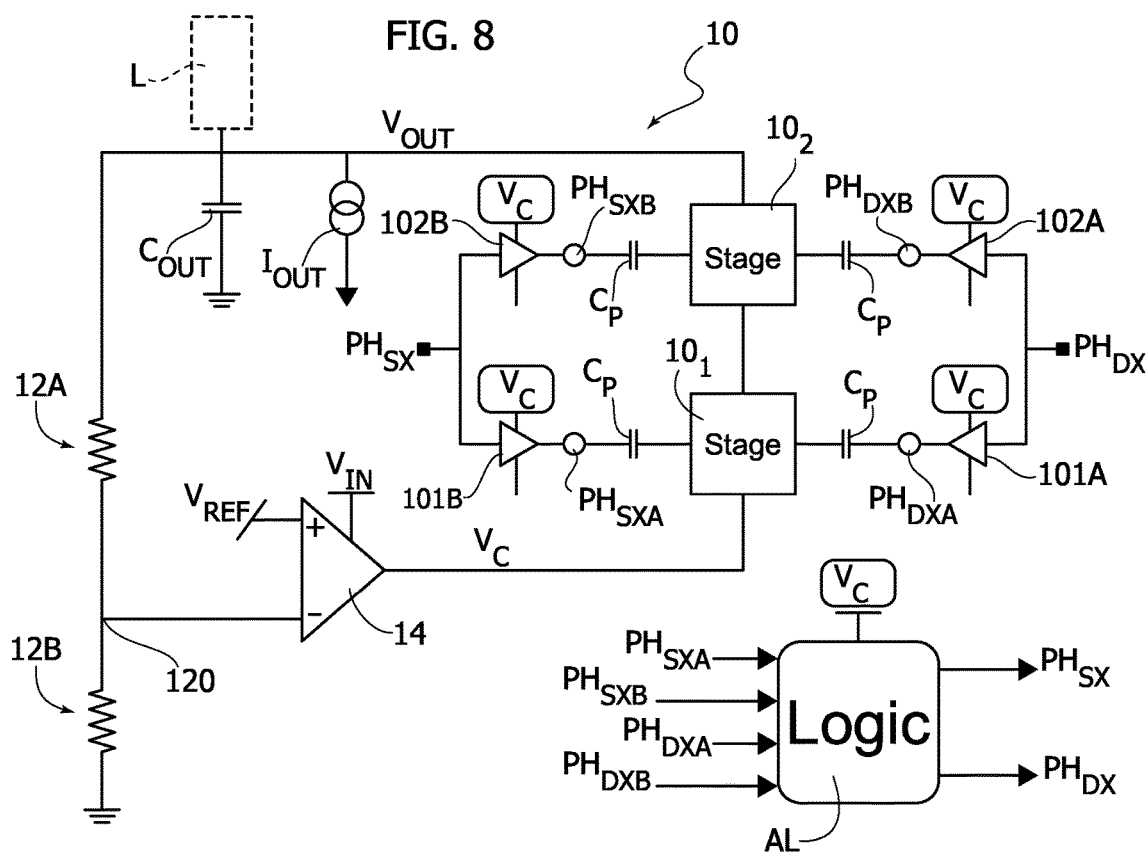
FIG. 8 is a block diagram of a closed-loop charge pump with bottom control combined with phase amplitude control, in which the phase management logic is supplied by the control loop voltage.
Figure 9:
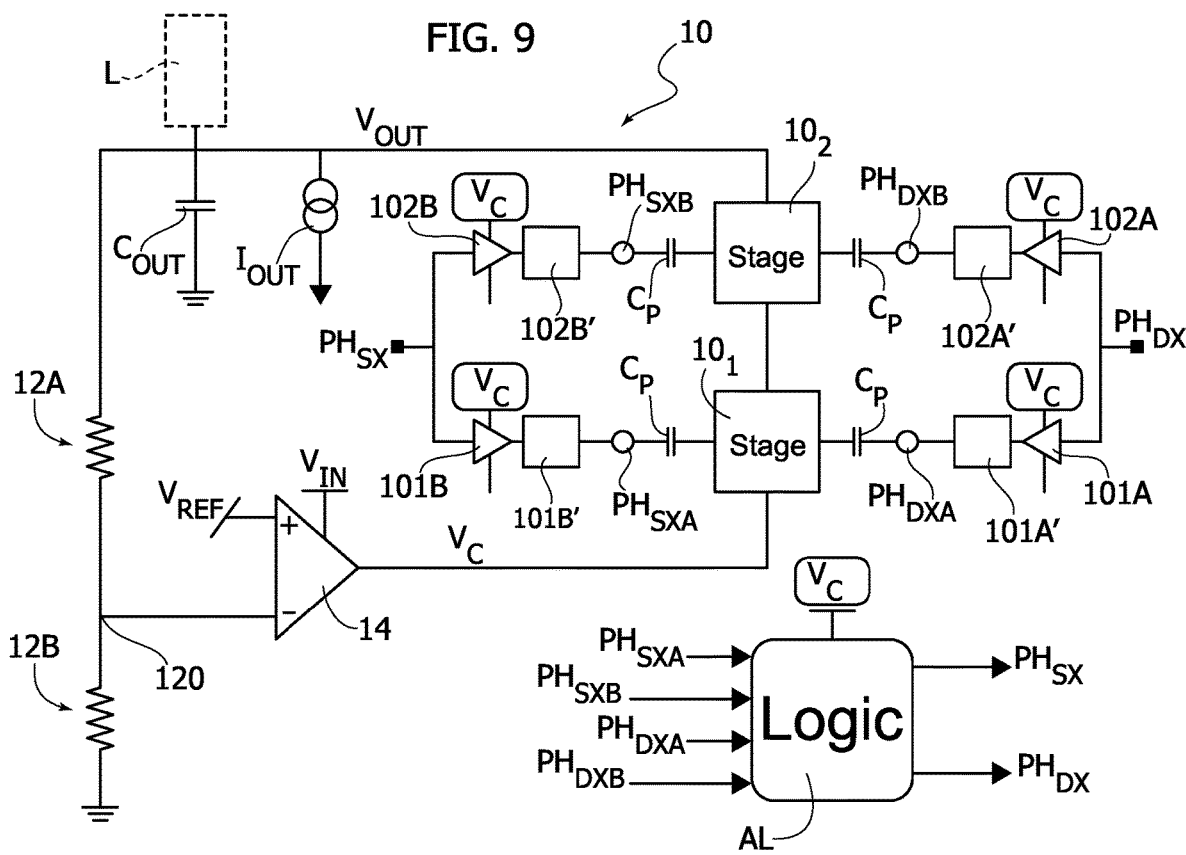
FIG. 9 is a circuit diagram essentially corresponding to FIG. 8 with a phase-doubler added in order to reduce the number of stages, thus reducing output impedance.

FIGS. 7 to 9 are illustrative of various approaches which may be resorted to in addressing the issues discussed previously.

Throughout FIGS. 7 to 9 parts or elements like parts or elements already discussed in connection with FIG. 6 (and any previous figure) will be indicates with like reference symbols: consequently, a corresponding detailed description of these parts or elements will not be repeated for brevity.

FIG. 7 is illustrative of embodiments where the control voltage $V_C$ is used to manage both the pump bottom voltage (as was already the case in FIG. 6) and the pumping phase amplitude, that is, the amplitude of the signals $PH_{SXA}$, $PH_{SXB}$, $PH_{DXA}$ and $PH_{DXB}$.

Such an approach as exemplified in FIG. 7 can be implemented by using for the amplifier stages 101A, 102A and 101B, 102B gain stages whose operation can be made dependent on, that is, a function of, $V_C$. This is illustrated in FIG. 7 by showing the amplifier stages 101A, 102A and 101B, 102B referred to rectangles labelled $V_C$, where the power supply voltage for the stages 101A, 102A, 101B, 102B is the voltage $V_C$.

Such stages can be implemented with any solution known to those of skill in the art for that purpose.

For instance, these gain stages may be implemented as driver stages that drive the flying capacitors, and may include, for instance, a series of (staggered or cascaded) inverters having gradually increasing sizes, with the last inverter in the series, the one with a switch having the lower or lowest value for Ron, coupled to the flying capacitor.

In one or more embodiments as exemplified in FIG. 7, the loop control voltage $V_C$ regulates the bottom voltage of the charge pump (see the coupling of the output of the differential stage $V_C$ to the stage $10_1$ of the charge pump) and the phases amplitude (that is, the amplitude of the signals $PH_{SXA}$, $PH_{SXB}$, $PH_{DXA}$ and $PH_{DXB}$) which results in a stronger control of the open load voltage $V_{OL}$.

The following relationships apply to embodiments as exemplified in FIG. 7:

$$V_{OL}=V_C*(N+1);$$

$$R_{OUT}=N/(2*C_P*F_{SW})$$

$$V_{OUT}=(N+1)*V_C-R_{OUT}*I_{OUT}.$$

(with, again, N=2 in the exemplary case shown).

One or more embodiments as exemplified in FIG. 7 provide various advantages, such as:

$dV_{OUT}=(N+1)dV_C$: namely a variation on $V_C$ is amplified on the output $V_{OUT}$ by the number of stages (here, two of them $10_1$ and $10_2$), which leads to a strong control on $V_{OL}$;

in contrast to what happens in FIG. 6, in FIG. 7 a variation in $V_{IN}$ has no effect on the amplitude of the pumping "phases" ($PH_{SXA}$, $PH_{SXB}$, $PH_{DXA}$ and $PH_{DXB}$) since such an amplitude is managed (controlled) by the control loop voltage $V_C$ from the output voltage $V_{OUT}$ via the divider 12A, 12B and the differential stage.

It is noted that one or more embodiments as exemplified in FIG. 7 may be further improved in respect of various points such as:

in one or more embodiments as exemplified in FIG. 7, a variation in $V_{IN}$ still changes the switching frequency $F_{SW}$ of the asynchronous logic AL, which may result in a transient on $V_{OUT}$; the PSRR with respect to $V_{IN}$ will also be generally small; and the control loop is able to change only $V_{OL}$ and has no control on the switching frequency $F_{SW}$, so that no control is exerted on the output resistance $R_{OUT}$ of the charge pump (reference is again made to the mode of FIG. 2), which may place constraints on transient response speed.

FIG. 8 is illustrative of embodiments which aim at addressing these issues, improving control strength and fast transient response.

Again, in FIG. 8 parts or elements like parts or elements already discussed in connection with any of the previous figures (FIGS. 6 and 7, primarily) will be indicated with like reference symbols: consequently, a corresponding detailed description of these parts or elements will not be repeated for brevity.

In one or more embodiments as exemplified in FIG. 8, the loop control voltage $V_C$ is used to control all the three key parameters of a charge pump such as 10: the bottom voltage (see the coupling of the output of the differential stage $V_C$ to the stage $10_1$ of the charge pump), the amplitude of the phases $PH_{SXA}$, $PH_{SXB}$, $PH_{DXA}$ and $PH_{DXB}$ (again using for the amplifier stages 101A, 102A and 101B, 102B stages receive a power supply voltage which is a function of, more preferably corresponding to, the voltage of the output control voltage $V_C$ from the differential stage) and the switching frequency $F_{SW}$.

In one or more embodiments, control of the switching frequency $F_{SW}$ can be implemented using the (variable) control voltage $V_C$ as the supply voltage of the asynchronous logic AL (in the place of the fixed voltage $V_{IN}$ as in the case in FIGS. 6 and 7).

The following relationships again apply to embodiments as exemplified in FIG. 8:

$$V_{OL}=V_C*(N+1);$$

$$R_{OUT}=N/(2*C_P*F_{SW})$$

$$V_{OUT}=(N+1)*V_C-R_{OUT}*I_{OUT}.$$

(with, again, N=2 in the exemplary case shown).

One or more embodiments as exemplified in FIG. 8 facilitate controlling both the open loop voltage $V_{OL}$ and the output resistance $R_{OUT}$.

In one or more embodiments as exemplified in FIG. 8, a change in $V_C$ increases both the open load voltage $V_{OL}$ and the switching frequency $F_{SW}$, thus decreasing the output resistance of the charge pump, $R_{OUT}$.

In comparison with solution as illustrated in the previous figures, one or more embodiments as exemplified in FIG. 8 may offer the following advantages:

a (very) strong control technique is implemented insofar as the loop (namely $V_C$) controls key parameters of the charge pump such as the open load voltage $V_{OL}$ and the output resistance $R_{OUT}$;

a (very) fast transient response is facilitated; and $V_{OUT}$ is (virtually totally) insensitive to $V_{IN}$: a change in $V_{IN}$ is not mirrored by changes in $V_{OL}$ and $R_{OUT}$, that means no change of $V_{OUT}$; this architecture also exhibits an excellent performance in terms of PSRR with respect to $V_{IN}$, which is constrained only by the PSRR of the error amplifier 14.

FIG. 9 is illustrative of embodiments which facilitate dealing with a value for $V_{OUT}$ desired to be (much) higher than $V_{IN}$.

To that effect "phase doublers" that is x2 gain stages 101A', 102A' and 101B', 102B' are coupled to the outputs of the amplifier stages 101A, 102A and 101B, 102B as commonly used to reduce the number of pumping stages and decrease the output resistance in a charge pump.

Again, it will be appreciated that in FIG. 9 parts or elements like parts or elements already discussed in connection with any of the previous figures (FIGS. 6, 7 and 8, primarily) will be indicated with like reference symbols: consequently, a corresponding detailed description of these parts or elements will not be repeated for brevity.

It is noted that the control strategies discussed previously in connection with of FIGS. 7 and 8 can be applied to phase-doubler utilization, as represented in FIG. 9.

The following relationships apply to embodiments as exemplified in FIG. 9:

$$V_{OL}=V_C*(2N+1);$$

$$R_{OUT}=N/(2*C_P*F_{SW})$$

$$V_{OUT}=(2N+1)*V_C-R_{OUT}*I_{OUT}.$$

(with, again, N=2 in the exemplary case shown).

In one or more embodiments as exemplified in FIG. 9, the loop control voltage $V_C$ is multiplied by a factor 2 by the phase doublers 101A', 102A' and 101B', 102B' and then used to pump the flying caps $C_P$. This facilitates reducing the output impedance $R_{OUT}$ by a factor of two.

It will be appreciated that while the designation "phase doubler" has been used in compliance with current parlance in the area, the components 101A', 102A' and 101B', 102B' are in fact "amplitude doublers" that may multiply by two the amplitude of the "phase" signals $PH_{SXA}$, $PH_{DXA}$, $PH_{SXB}$, $PH_{DXB}$.

Here again, the logic approach with phase doublers 101A', 102A' and 101B', 102B' such as illustrated in FIG. 9 can rely on using the feedback signal of the internal nodes of the flying caps, $PH_{SXA}$, $PH_{DXA}$, $PH_{SXB}$, $PH_{DXB}$, as the input signal for the asynchronous logic AL.

In that respect, one or more embodiments may take advantage of reducing as much as possible the propagation delays of digital signals in the asynchronous logic AL in order to increase the switching frequency $F_{SW}$.

One or more embodiments as exemplified in FIG. 9 share with embodiments as exemplified in FIG. 8 the same advantages in terms of control strength, fast transient response and (very) high PSRR with respect to $V_{IN}$.

One or more embodiments as exemplified herein may provide various advantages.

A first advantage lies in the strength of the control procedure: the loop control voltage $V_C$ may manage both, $V_{OL}$ and $R_{OUT}$; this means that a small variation of the control voltage $V_C$ may result in a (very) large variation in $V_{OUT}$, while maintaining accuracy and precision on the output voltage $V_{OUT}$.

Another advantage is related to transient response: this can be made (very) fast since important parameters of the charge pump, such as $V_{OL}$ and $R_{OUT}$, can controlled by the loop.

A further advantage lies in the high PSRR with respect to the supply voltage $V_{IN}$: important parameters of the charge pump are managed by the loop control voltage $V_C$ rather than by $V_{IN}$; this facilitates achieving a very high PSRR with respect to $V_{IN}$, constrained only by the PSRR of the error amplifier.

Still another advantage related to the strength of the control strategy lies in the possibility of reducing the size of the flying capacitors $C_P$, which results in substantial benefits in terms of area occupation.

Those of skill in the art will otherwise appreciate that while such advantages may be primarily related to embodiments as exemplified in FIGS. 8 and 9; however, also embodiments as exemplified in FIG. 7 may provide such appreciable improvements over conventional solutions.

A charge pump circuit (for instance, 10) as exemplified herein may comprise:

a plurality of charge pump stages (for instance, $10_1$, $10_2$) coupled between (respective) pairs of flying capacitors (for instance, with each stage coupled between two capacitors $C_P$), said plurality of charge pump stages arranged (stacked) in a cascaded arrangement between a bottom voltage line (for instance, $V_C$) and an output voltage line (for instance, $V_{OUT}$, to pump electric charge thereto);

gain stages (for instance, 101A, 101B, 102A, 102B) configured to apply to said charge pump stages via said flying capacitors pump phase signals (for instance, $PH_{SXA}$, $PH_{DXA}$, $PH_{SXB}$, $PH_{DXB}$) having a (pump phase signal) amplitude; and a feedback signal path (for instance, 12A, 12B, 14) from said output voltage line to said bottom voltage line, the feedback signal path configured to apply to said bottom voltage line a feedback control signal which is a function of the voltage (for instance, via 12A, 12B and 14) at said output voltage line (for instance, as function of the difference to a reference level $V_{REF}$);

wherein said gain stages are coupled to said feedback signal path to receive therefrom said feedback control signal, wherein the amplitude of said pump phase signals is a function of said feedback control signal (being thus controlled thereby).

As exemplified herein, these gain stages may be implemented as driver stages that drive the flying capacitors.

For instance, these gain stages may include a series of (staggered or cascaded) inverters having gradually increasing sizes, with the last inverter in the series, the one with a switch having the lower or lowest value for Ron, coupled to the flying capacitor.

A charge pump circuit as exemplified herein may comprise:

asynchronous logic circuitry (for instance, AL) configured to provide switching drive signals (for instance, $PH_{DX}$, $PH_{SX}$) for said gain stages with a switching frequency (for instance, $F_{SW}$), wherein said switching frequency is a function of a supply voltage applied to said asynchronous logic circuitry;

wherein said asynchronous logic circuitry is coupled to said feedback signal path to be supplied with said feedback control signal wherein said switching frequency asynchronous logic circuitry is a function of said feedback control signal (being thus controlled thereby).

A charge pump circuit as exemplified herein may comprise said asynchronous logic circuitry configured to produce said switching drive signals for said gain stages as a function of said pump phase signals having an amplitude applied to said charge pump stages via said flying capacitors.

A charge pump circuit as exemplified herein may comprise gain multipliers (for instance, 101A', 101B', 102A', 102B') coupled to said gain stages to multiply the amplitude of said pump phase signals applied to said charge pump stages via said flying capacitors.

In a charge pump circuit as exemplified herein said gain multipliers (for instance, 101A', 101B', 102A', 102B') comprise x2 gain multipliers coupled to said gain stages to double the amplitude of said pump phase signals applied to said charge pump stages via said flying capacitors.

A device as exemplified herein may comprise:

a charge pump circuit (for instance, 10) as exemplified herein; and an electrical load (for instance, L) coupled to said output voltage line in said charge pump circuit (10) to be supplied thereby.

A method as exemplified herein may facilitate controlling a charge pump circuit, wherein the charge pump circuit comprises a plurality of charge pump stages coupled between pairs of flying capacitors, said plurality of charge pump stages arranged in a cascaded arrangement between a bottom voltage line and an output voltage line.

A method as exemplified herein may comprise:

applying to said charge pump stages via said flying capacitors pump phase signals having an amplitude;

producing (for instance, via 12A, 12B, 14) a feedback control signal which is a function of the voltage at said output voltage line; and controlling as a function of said feedback control signal both the voltage at said bottom voltage line and the amplitude of said pump phase signals applied to said charge pump stages via said flying capacitors.

A method as exemplified herein may comprise:

providing asynchronous logic circuitry (for instance, AL) configured to provide switching drive signals (for instance, $PH_{DX}$, $PH_{SX}$) for said plurality of charge pump stages with a switching frequency (for instance, $F_{SW}$), wherein said switching frequency is a function of a supply voltage applied to said asynchronous logic circuitry; and controlling said supply voltage applied to said asynchronous logic circuitry as a function of said feedback control signal.

A control method as exemplified herein may comprise producing said switching drive signals (for instance, $PH_{DX}$, $PH_{SX}$) for said gain stages (for instance, 101A, 101B, 102A, 102B) via said asynchronous logic circuitry as a function of said pump phase signals (for instance, $PH_{SXA}$, $PH_{DXA}$, $PH_{SXB}$, $PH_{DXB}$) having an amplitude applied to said charge pump stages via said flying capacitors.

Without prejudice to the underlying principles, the details and embodiments may vary, even significantly, with respect to what has been described by way of example only without departing from the extent of protection.

The claims are an integral part of the technical teaching provided herein in respect of illustrative embodiments.

The extent of protection is determined by the annexed claims.

The invention claimed is:

1. A charge pump circuit, comprising:
  a plurality of charge pump stages coupled between pairs of flying capacitors, said plurality of charge pump stages arranged in a cascaded arrangement between a bottom voltage line and an output voltage line;
  gain stages configured to apply pump phase signals to said charge pump stages via said flying capacitors, said pump phase signals having an amplitude; and
  a feedback signal path between said output voltage line to said bottom voltage line, the feedback signal path configured to apply to said bottom voltage line a feedback control signal which is a function of a voltage at said output voltage line;
  asynchronous logic circuitry configured to provide switching drive signals for said gain stages with a switching frequency;
  wherein said asynchronous logic circuitry is coupled to receive a power supply voltage as said feedback control signal;

wherein said switching frequency of the asynchronous logic circuitry is a function of said feedback control signal;

wherein said gain stages are supplied power from the feedback control signal; and wherein the amplitude of said pump phase signals is a function of said feedback control signal.

2. The charge pump circuit of claim 1, wherein said asynchronous logic circuitry is configured to produce said switching drive signals for said gain stages as a function of said pump phase signals having an amplitude applied to said charge pump stages via said flying capacitors.

3. The charge pump circuit of claim 1, further comprising gain multipliers coupled to said gain stages to multiply the amplitude of said pump phase signals applied to said charge pump stages via said flying capacitors.

4. The charge pump circuit of claim 3, wherein said gain multipliers are configured to double the amplitude of said pump phase signals applied to said charge pump stages via said flying capacitors.

5. The charge pump circuit of claim 1, wherein said asynchronous logic circuitry includes an input configured to receive a pump phase signal from an output of a gain stage of the gain stages and an output configured to generate a control phase signal applied to an input of the gain stage.

6. The charge pump circuit of claim 1, wherein the plurality of charge pump stages includes a first stage and a second stage, and wherein said gain stages include a first gain stage configured to output a first pump phase signal applied to the first stage and a second gain stage configured to output a second pump phase signal applied to the second stage, and wherein said asynchronous logic circuitry includes a first input configured to receive the first pump phase signal, a second input configured to receive the second pump phase signal, and a first output configured to generate a first control phase signal applied to inputs of the first and second gain stages in response to the first and second pump phase signals.

7. The charge pump circuit of claim 6, wherein said gain stages include a third gain stage configured to output a third pump phase signal applied to the first stage and a fourth gain stage configured to output a fourth pump phase signal applied to the second stage, and wherein said asynchronous logic circuitry includes a third input configured to receive the third pump phase signal, a fourth input configured to receive the fourth pump phase signal, and a second output configured to generate a second control phase signal applied to inputs of the third and fourth gain stages in response to the third and fourth pump phase signals.

8. The charge pump circuit of claim 1, further comprising an electrical load coupled to said output voltage line to be supplied thereby.

9. A method of controlling a charge pump circuit, wherein the charge pump circuit comprises a plurality of charge pump stages coupled between pairs of flying capacitors, said plurality of charge pump stages arranged in a cascaded arrangement between a bottom voltage line and an output voltage line;

wherein the method comprises:

applying pump phase signals to said charge pump stages via said flying capacitors, said pump phase signals having an amplitude;

producing a feedback control signal which is a function of a voltage at said output voltage line;

providing a power supply voltage for controlling the amplitude of said pump phase signals as a function of a voltage of said feedback control signal; and using asynchronous logic circuitry to provide switching drive signals for said plurality of charge pump stages with a switching frequency, wherein said switching frequency is a function of a logic supply voltage derived from said feedback control signal.

10. The method of claim 9, wherein said logic supply voltage is equal to the voltage of said feedback control signal.

11. The method of claim 9, further comprising producing said switching drive signals for said gain stages via said asynchronous logic circuitry as a function of said pump phase signals.

* * * * *